(54) METHOD OF OIL CLEANUP USING COCONUT COIR PITH

(76) Inventor: Tilak V. Silva, 1049 W. 161$^{st}$ St., Gardena, CA (US) 90247

(*) Notice: Subject to any disclaimer, the term of this patent is extended or adjusted under 35 U.S.C. 154(b) by 0 days.

(21) Appl. No.: 09/513,868

(22) Filed: Feb. 28, 2000

(51) Int. Cl.$^7$ ................................................ B08B 3/02
(52) U.S. Cl. ........................................ 134/7; 210/502
(58) Field of Search ........................................ 134/7, 6

(56) References Cited

U.S. PATENT DOCUMENTS

| | | | | |
|---|---|---|---|---|
| 4,172,039 A | * | 10/1979 | Akiyama | 210/502 |
| 4,240,800 A | * | 12/1980 | Fischer | 44/51 |
| 5,422,330 A | * | 6/1995 | Kaylor | 502/402 |

* cited by examiner

Primary Examiner—Randy Gulakowski
Assistant Examiner—Gentle E. Winter
(74) Attorney, Agent, or Firm—Charles H. Thomas

(57) ABSTRACT

A totally biodegradable oil absorption material is utilized to clean up oil spills on both land and water. Particles of coconut coir pith between about one-quarter of an inch and one inch in size are utilized for this purpose. The flakes or granules of coconut coir pith are spread upon the surface of the oil spill. The coconut coir pith readily absorbs the oil and remains in a form that can be easily recovered by scooping or raking. Once recovery is complete, the oil-saturated coconut coir pith can be subjected to squeezing by pressure to liberate the oil collected. Following extraction of the absorbed oil, the coconut coir pith can be reused for subsequent oil cleanup operations. Also, the oil extracted from the coconut coir pith is not contaminated and can be used as well. Coconut coir pith is a byproduct obtained from the husks of coconuts as those husks are processed to make fiber ropes and other articles.

14 Claims, 3 Drawing Sheets

METHOD OF OIL CLEANUP USING COCONUT COIR PITH

BACKGROUND OF THE INVENTION

1. Field of the Invention

The present invention involves a method for absorbing oil spills utilizing a material, the absorbing properties of which for cleaning up contaminating oil spills, have previously gone unrecognized. More specifically, the invention involves utilizing coconut coir pith as an absorbent medium in cleaning up spilled oil.

2. Description of the Prior Art

In recent years there has been an ever increasing awareness of the devastating environmental damage that can be caused by oil spills. It is well recognized that an extremely important aspect of minimizing damage from an oil spill is the prompt containment and collection of the spilled oil. Effective collection of spilled oil ideally involves the absorption of oil in some absorption medium that can be easily raked or otherwise picked up from the surface upon which the oil has spilled. Nevertheless, despite intensive research and testing, the only absorption substances which are at all suitable for use in cleaning up oil spills involve significant defects or difficulties.

Some conventional oil absorbents currently in commercial use are made from polypropylene. Polypropylene absorbs hydrocarbons but is hydrophobic. That is, it is water repellent. However, polypropylene has a limited oil absorbing capacity, and is not at all biodegradable. Also, polypropylene is quite expensive to use in the large quantities necessary to deal with major oil spills.

Efforts have been made to find other oil absorbent materials suitable for cleaning up oil spills which are biodegradable. For example, peat moss has been used for this purpose. However, in the form in which it is obtainable commercially, peat moss contains a significant amount of impurities such as a sand and carbon. Also, peat moss does not float on water well and is limited in its absorption capacity for oil. For example, one pound of peat moss will absorb about five pounds of oil. In addition, peat moss is not totally biodegradable.

Another substance which has been tested for its oil absorbent capacity in cleaning up oil spills is a seaweed-based product that is normally sold as a soil conditioner. This product is sold under the registered trademark, Afrikelp, and is comprised of a blend of selected brown seaweeds found off the southern coast of the African continent. However, this product is rather expensive and has a limited oil absorption capability.

SUMMARY OF THE INVENTION

According to the present invention, a substance has been found which is readily available and which makes an ideal oil absorption medium. Moreover, this product is completely biodegradable. Specifically, the present invention involves the use of coconut coir pith as an oil absorption medium in cleaning up oil spills.

Coconut coir pith is a residual byproduct produced from making coconut fiber ropes and mattresses. Coconut coir pith is a portion of the coconut husk that falls as a residual powder when coconut husk fibers are crushed in the manufacture of ropes and other products. Coconut coir pith is currently sold commercially for use in landscaping for its moisture barrier properties. It is typically sold for use in golf courses. A layer of coconut coir pith is spread upon a dirt surface to be sodded. The sod is then laid upon the coconut coir pith layer. The coconut coir pith aids in the retention of moisture by the sod and thereby aids in the prevention of burning of the sod by the sun in hot weather. Coconut coir pith is also conventionally used under plants and floor pots for the purpose of retaining moisture above to enhance plant growth. While coconut coir pith may be obtained from many different sources, one source of supply is Marvel Collections Ltd., located at 71 Ward Place, Colombo, Sri Lanka.

Although coconut coir pith has been commercially available for many many, years, it's oil absorption properties and potential use for absorbing oil in oil spill situations has heretofore gone unrecognized. I have discovered that coconut coir pith, particularly when utilized in small particulate sizes, serves as an ideal oil absorption medium. Moreover, coconut coir pith may be utilized to clean up oil spills not only on solid surfaces, such as highways, concrete slabs and soil, but also upon the surfaces of bodies of water. Coconut coir pith floats and absorbs oil in preference to water. One pound of coconut coir pith will absorb between about eight and ten pounds of crude oil.

A very significant advantage of coconut coir pith over conventional oil absorption substances used to absorb oil in oil spill situations is that coconut coir pith is one hundred percent biodegradable. Coconut coir pith floats upon water and remains afloat even when saturated with oil. Coconut coir pith absorbs oil, coolants, solvents and other oily materials that float on water.

Coconut coir pith is entirely nontoxic. It is light in weight and creates very little dust even when thrown a considerable distance onto a surface from which oil is to be absorbed.

Furthermore, coconut coir pith has an additional advantage in that it retains its consistency, even when spread on water and saturated with oil. That is, it will not turn to "mush" even when wet and saturated with oil. This feature allows the oil-saturated coconut coir pith to be scooped or raked from the surface of a body of water without great difficulty.

When utilized to absorb oil on the surface of a body of water, coconut coir pith absorbs more than one gallon of oil per pound. The extent of absorption depends upon the viscosity of the oil. Moreover, coconut coir pith reduces volatile vapors from the oil by up to 90 percent. Coconut coir pith is ideal for use in cleaning up ocean oil spills, as well as for use in cleaning up both outdoor and indoor spills on the ground or on pavement.

In one broad aspect of the invention may be considered to be a method of collecting oil upon a surface comprising: dispensing a quantity of coconut coir pith across the surface, whereupon the oil is absorbed into the coconut coir pith, and thereafter removing the coconut coir pith from the surface. Preferably the coconut coir pith is dispensed in particulate form in which the particles have an average maximum dimension of no greater than one and one-half inches. The coconut coir pith can also be used in other forms such as bullets, grains, gravels, pellets, briquettes, and other shapes and sizes Coconut coir pith is sold commercially in granular, loose, and disk-shaped forms. At present, coconut coir pith is often sold in disk-shaped cakes having a diameter of about three inches and a thickness of about one inch. If the substance is obtained in disk form, it is advisable to break the disks up into smaller particles. The disk-shaped cakes in which coconut coir pith is sold commercially may be passed through a series of pairs of counterrotating, crushing rollers to reduce the size of the cakes at a ten to one ratio. The pairs of rollers are spaced at decreasing distances. The final pair of rollers is equipped with blades that chop the coconut coir pith into particles of between about one-quarter inch and one inch in size. The particles of coconut coir pith are dispersed from the final pair of rollers into a hopper and channeled into a bagging machine.

According to one embodiment of the present invention the coconut coir pith is in the form of particles having an average maximum dimension of no greater than about one and one-half inches.

One primary area of application of the method of the invention is in cleaning up petroleum-based oil spills in bodies of water such as oceans, lakes, and rivers. To aid in the cleanup, it is often advisable to surround the area of the surface upon which the oil is present with a spill containment boom. Preferably the spill containment boom has a floating portion that includes coconut coir pith confined within a surrounding, elongated, porous covering. The coconut coir pith within the covering maintains the boom afloat, and the oil that makes contact with the boom is absorbed within the coconut coir pith located within the porous covering, as well as by the quantities of coconut coir pith thrown onto the oily surface of the water surrounded by the containment boom.

A further advantageous feature of the invention is that a very substantial portion of the oil can be extracted from the coconut coir pith once the oil-saturated coconut coir pith has been removed from the site of the oil spill. To extract the oil, the saturated coconut coir pith is pressed or squeezed by rollers or by a press. As the oil is squeezed out of the coconut coir pith, it is filtered and collected in a receptacle. It is possible to recover between about seventy-five percent and about ninety percent of the oil absorbed by the coconut coir pith in this manner.

Furthermore, the recovered oil, which would otherwise constitute hazardous, contaminated waste, is in a reusable form. In addition, once the absorbed oil has been squeezed out, the coconut coir pith also is available for reuse to collect oil from future spills. The coconut coir pith can be reused about three or four times, provided that the oil is pressed out of it following each use. After that, the coconut coir pith can either be incinerated or used for landfill. Coconut coir pith is one hundred percent biodegradable so it will totally decompose when used as landfill.

In another broad aspect, the invention may be considered to be a method of collecting spilled oil from a surface comprising: spreading a quantity of coconut coil pith upon the surface, whereupon the coconut coir pith absorbs the oil, and recovering the coconut coir pith with the oil absorbed therein.

While the invention is equally applicable to oil spills on land as well as at sea, use of the invention to control oil spills in water represents a very major application of the invention. In this aspect, the invention may be considered to be a method of cleaning up a petroleum spill in water comprising: dispensing upon the surface of water on which a spill has occurred a quantity of coconut coir pith, which thereupon absorbs petroleum while remaining afloat, collecting the coconut coir pith with petroleum absorbed therewithin, and removing the coconut coir pith from the water. These steps are preferably followed by squeezing the coconut coir pith following the step of removal, and recovering petroleum for use from the coconut coir pith as it is squeezed out.

The method of the invention is preferably practiced for cleanup of petroleum spills in water by confining the petroleum spill. This may be accomplished by placing socks about the area of the spill. The socks are formed of porous sheaths filled with additional quantities of the coconut coir pith.

The invention may be described with greater clarity and particularity by reference to the following examples and accompanying drawings.

DESCRIPTION OF IMPLEMENTATION OF THE METHOD

Figure 1:
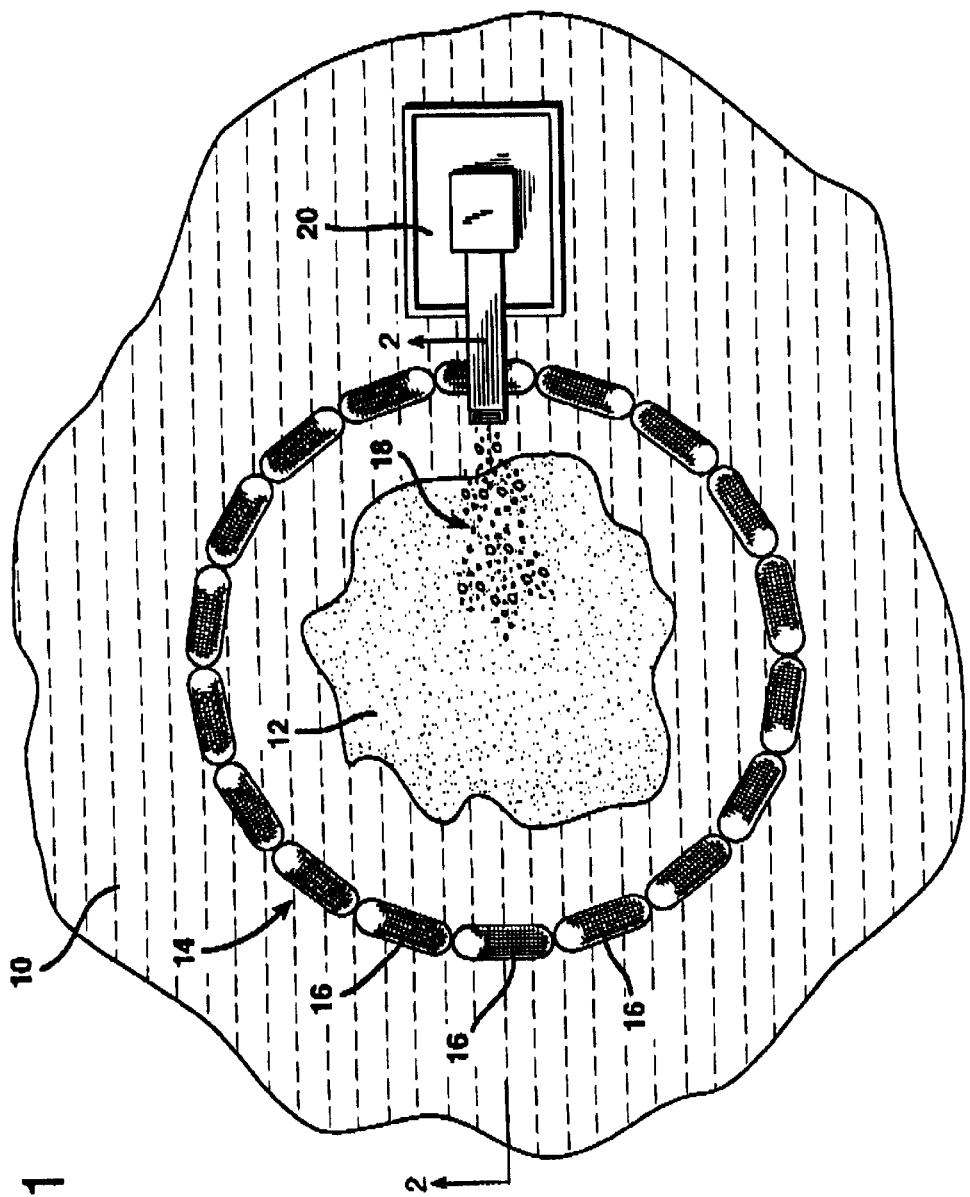
FIG. 1 is a top plan view illustrating the implementation of the method of the invention in a typical oil spill situation on a body of water.
Figure 2:
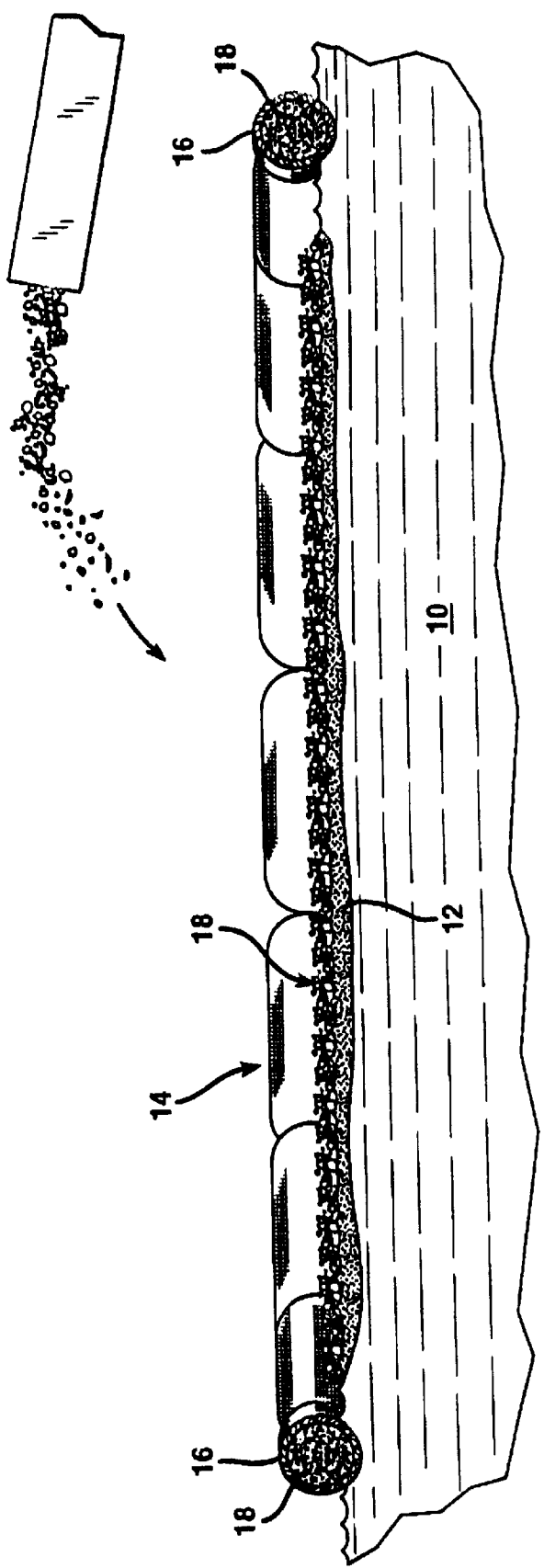
FIG. 2 is a sectional elevational view take along the lines 2—2 of FIG. 1.

FIG. 1 illustrates the practice of the method of the invention in a typical oil spill situation on a body of water 10. As shown in FIGS. 1 and 2, a substantial quantity of petroleum crude oil 12 is shown spilled on the body of water 10. The oil 12 will tend to float on the surface of the body of water 10, but unless promptly cleaned up the oil 12 will disperse as droplets into the water 10, thus increasing the difficulty of cleanup.

To clean up this spill, an oil containment boom 14 is deployed upon the surface of the body of water 10 about the area thereof upon which the oil 12 has spread. Oil containment booms are solid floating barriers to contain oil spills in the ocean, in harbors, rivers, streams, and lagoons, etc. The oil containment boom 14 should be deployed some distance beyond the initial perimeter of the oil 12, since the oil 12 will spread outward upon the surface of the body of water 10.

In the situation illustrated in FIGS. 1 and 2 the oil containment boom 14 is formed of a multiplicity of socks 16 linked together and placed about the area of the spilled oil 12 so as to totally encompass that area. Each of the socks 16 is formed of an outer, porous sheath containing a quantity of coconut coir pith indicated at 18 in FIG. 2. Each of the socks 16 may be between about three inches and six inches in diameter and between about two feet and four feet in length. The socks 16 are tied off at their ends and linked together to completely surround the oil spill 12, as shown in FIG. 1.

Contemporaneously with deployment of the oil containment boom 14, coconut coir pith 18 is dispensed upon the surface of the water 10 upon which the spilled oil 12 is floating. The particles of coconut coir pith 18 preferably have a maximum dimension of between about one-quarter inch and one inch. The particles of coconut coir pith 18 may be dispensed from a barge 20 containing a supply of the coconut coir pith 18 in bulk form. The coconut coir pith 18 may be spread upon the spilled oil 12 using a blowing machine like a wood chipper or snow blower.

The quantity of coconut coir pith 18 that is cast onto the spilled oil 12 will vary depending upon the volume of oil 12 that has been spilled. Each pound of coconut coir pith 18 will absorb between about eight and ten pounds of the spilled oil 12. Therefore, a sufficient amount of the coconut coir pith 18 should be utilized to absorb all of the spilled oil 12.

The oil 12 is absorbed by the coconut coir pith 18 upon contact. The coconut coir pith 18 floats upon the body of water 10 and also upon the surface of the spilled oil 12. Consequently, there is a high degree of contact between the spilled oil 12 and the coconut coir pith 18, provided that the particles of coconut coir pith 18 are accurately spread over the surface of the oil spill 12.

While the spilled oil 12 remains upon the surface of the body of water 10, it will tend to spread laterally until it encounters the socks 16. Since the sheaths surrounding the coconut coir pith 18 in the socks 16 are porous, the oil from the oil spill 12 that does reach the containment boom 14 will be absorbed by the coconut coir pith 18 within the socks 16.

Figure 3:
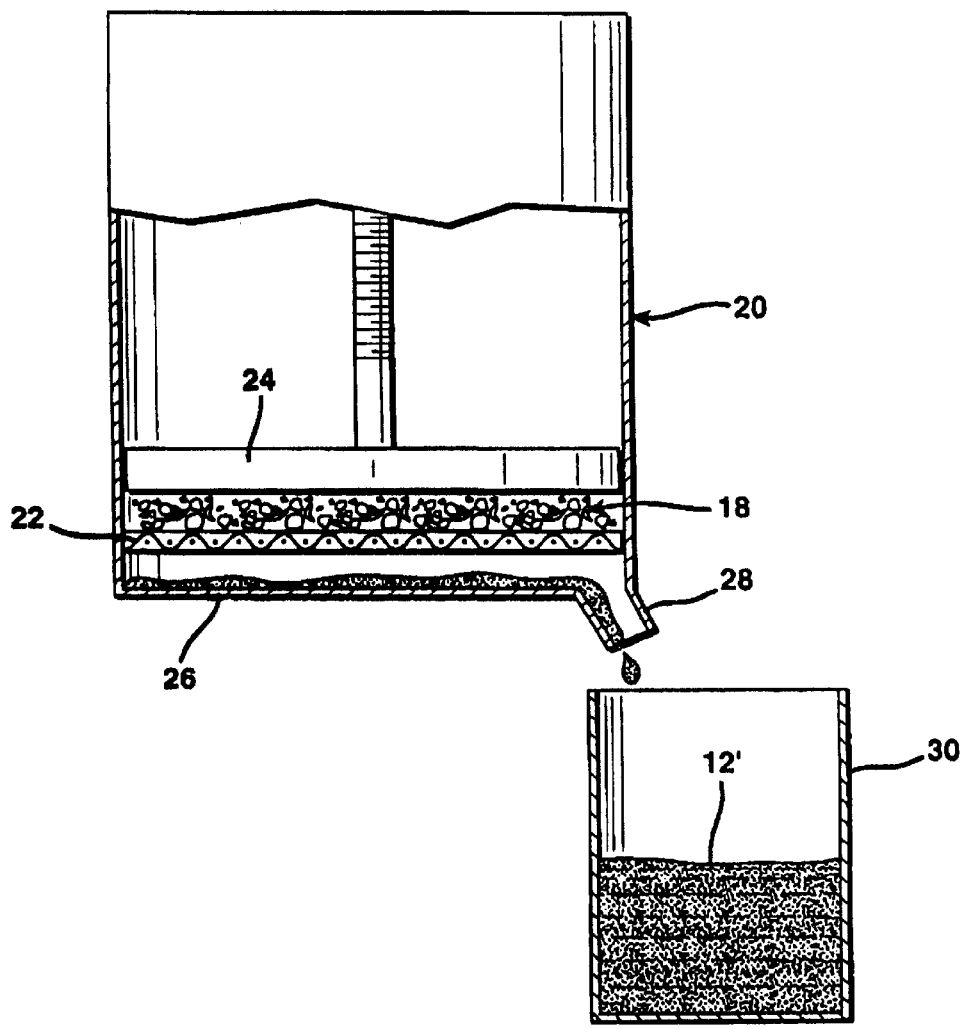
FIG. 3 is an elevational diagram illustrating the step of squeezing the oil-saturated coconut coir pith to extract oil therefrom.

Once the spilled oil 12 has contacted and has been absorbed by the coconut coir pith 18, the coconut coir pith 18 remains floating on the body of water 10 and can be collected and removed from the surface of the body of water 10 utilizing conventional oil absorbent material raking and scooping equipment. Preferably, both the coconut coir pith 18 and the absorbed oil are reused following recovery of the oil-saturated coconut coir pith 18 from the body of water 10. FIG. 3 diagrammatically illustrates the process of extracting oil from the oil-saturated coconut coir pith 18.

As shown in FIG. 3, the oil saturated coconut coir pith 18 is placed in a high walled receptacle 20 once it has been removed from the body of water 10. The receptacle 20 has solid side walls and a rigid, steel grate 22 near its bottom with perforations therethrough that are smaller in diameter than the minimum particulate size of the particles of coconut coir pith 18. A hydraulic press 24 is then operated in the container 20 and presses downwardly upon the recovered oil-saturated coconut coir pith 18. As the hydraulic press 24 presses and squeezes the oil-saturated coconut coir pith 18 against the perforated grate 22, the oil absorbed in the coconut coir pith 18 is squeezed out and passes through the perforations in the grate 22. The floor 26 of the container 20 is sloped slightly to a drain 28 through which the extracted oil 12' drips into an oil recovery vessel 30. Between about seventy-five percent and ninety percent of the oil absorbed by the coconut coir pith 18 can be recovered in the recovery vessel 30 using this extraction and recovery technique. The oil 12' can be reused, as can the particles of coconut coir pith 18 left in the container 20.

The particles of coconut coir pith 18 can be used and reused several times if the oil 12' is extracted following each spill cleanup effort. After about three or four uses, however, the particles of coconut coir pith 18 should be discarded. One method of disposal is incineration. However, because the coconut coir pith 18 is completely biodegradable, it can be used as landfill. With time, it will decompose completely, one hundred percent, into totally nontoxic decomposition products.

Undoubtedly, numerous variations and modifications of the invention will become readily apparent to those familiar with oil spill cleanup absorbents. For example, the particles of coconut coir pith 18 may be spread upon and absorb oil spilled upon a solid surface. Instances in which the method of the invention may be utilized in this manner include oil spills by tanker trucks on highways, oil spills in garages and automotive vehicle repair shops, and even oil spills on dirt surfaces. In each application, the cleanup technique is essentially the same. That is, the coconut coir pith is spread in particulate form upon the surface of spilled oil. Upon contact, the oil is absorbed into the coconut coir pith. The oil-saturated coconut coir pith is easily raked and collected.

Accordingly, the scope of the invention should not be construed as limited to the specific manner of implementation depicted and described, but rather is defined in the claims appended hereto.

I claim:

1. A method of collecting oil upon a surface comprising: dispensing a quantity of coconut coir pith having a particle size of between about one-quarter and about one and one-half inches in loose form across said surface, whereupon said oil is absorbed into said coconut coir pith, and thereafter removing said coconut coir pith from said surface by scooping it up.

2. A method according to claim 1 wherein said coconut coir pith is dispensed in particulate form.

3. A method according to claim 2 wherein said surface is the surface of a body of water and said oil is petroleum-based.

4. A method according to claim 2 wherein said surface is a solid surface.

5. A method according to claim 2 wherein said oil is petroleum-based and further comprising dispensing at least about one pound of said coconut coir pith for each gallon of said oil to be absorbed.

6. A method according to claim 1 further comprising pressing said coconut coir pith following absorption of said oil to liberate said oil therefrom, and collecting said oil so liberated for reuse.

7. A method of collecting spilled oil from a surface comprising: spreading a quantity of coconut coir pith in bulk form upon said surface, wherein said coconut coir pith has a particle size of between about one-quarter and about one and one-half inches whereupon said coconut coir pith absorbs said oil, and recovering said coconut coir pith with said oil absorbed therein from said surface by raking it up.

8. A method according to claim 7 wherein said surface is the surface of a body of water.

9. A method according to claim 8 wherein said oil is petroleum-based.

10. A method according to claim 9 further comprising deploying a containment boom upon said surface of said body of water about the area thereof upon which said coconut coir pith is spread.

11. A method according to claim 7 wherein said surface is a solid surface.

12. A method according to claim 7 further comprising recovering at least a portion of said oil following said step of recovering said coconut coir pith by squeezing said coconut coir pith and collecting said oil that emanates from said coconut coir pith as it is squeezed.

13. A method of cleaning up a petroleum spill in water comprising: dispensing in bulk upon the surface of water in which a spill has occurred a quantity of coconut coir pith particles having a size of between about one-quarter and about one and one-half inches which particles thereupon absorb petroleum while remaining afloat, collecting said coconut coir pith particles with petroleum absorbed therewithin by raking, and removing said coconut coir pith particles from said water by scooping.

14. A method according to claim 13 further comprising squeezing said coconut coir pith following said step of removal and recovering petroleum for use from said coconut coir pith as it is squeezed out.

\* \* \* \* \*